United States Patent [19]
Burst et al.

[11] 3,869,166
[45] Mar. 4, 1975

[54] FRONT END FOR INCREASING DYNAMIC WHEEL PRESSURE OF PASSENGER MOTOR VEHICLES

[75] Inventors: Hermann Burst, Stuttgart; Rolf Wiener, Gartringen, both of Germany

[73] Assignee: Dr. -Ing. h.c.F. Porsche K.G., Stuttgart-Zuffenhausen, Germany

[22] Filed: Nov. 14, 1972

[21] Appl. No.: 306,384

[30] Foreign Application Priority Data
Nov. 15, 1971 Germany.......................... 2156588

[52] U.S. Cl. ............. 293/69 R, 296/1 S, 180/1 FV
[51] Int. Cl. ...................... B60r 19/04, B62d 37/00
[58] Field of Search............... 105/2 R, 2 A, 74, 77; 296/1 S; 180/1 FV; 293/60, 63, 69 R, 69 V, 81, 82, 70

[56] References Cited
UNITED STATES PATENTS

| | | | |
|---|---|---|---|
| 2,036,560 | 4/1936 | Backus................................. | 293/63 |
| 2,633,379 | 3/1953 | Kraeft.................................. | 293/63 |
| 2,719,053 | 9/1955 | McInnis............................... | 296/1 S |
| 2,759,755 | 8/1956 | Johnson............................... | 293/63 |
| 3,618,998 | 11/1971 | Swauger.............................. | 296/1 S |
| D150,578 | 8/1948 | Kasnicka.............................. | 293/81 |

FOREIGN PATENTS OR APPLICATIONS
1,336,673   7/1963   France................................ 296/1 S

*Primary Examiner*—Lloyd L. King
*Assistant Examiner*—Robert Saifer
*Attorney, Agent, or Firm*—Craig & Antonelli

[57] ABSTRACT

A front end for passenger motor vehicles with a bumper and with a device for increasing the dynamic wheel pressure which is arranged at a terminal wall extending underneath the bumper that passes over into the bumper as a shaped part.

6 Claims, 4 Drawing Figures

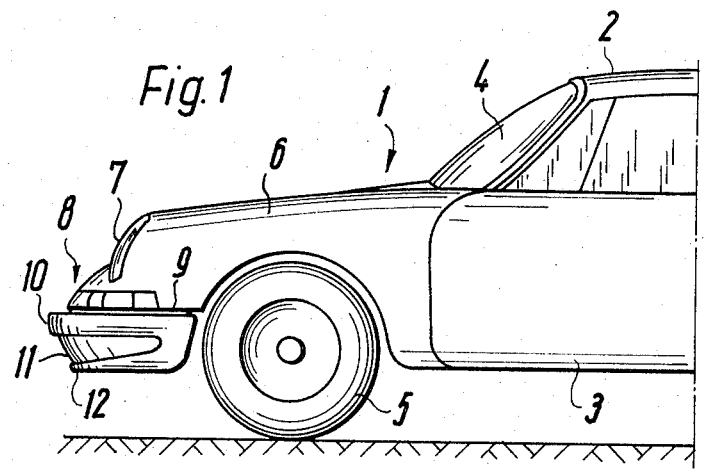
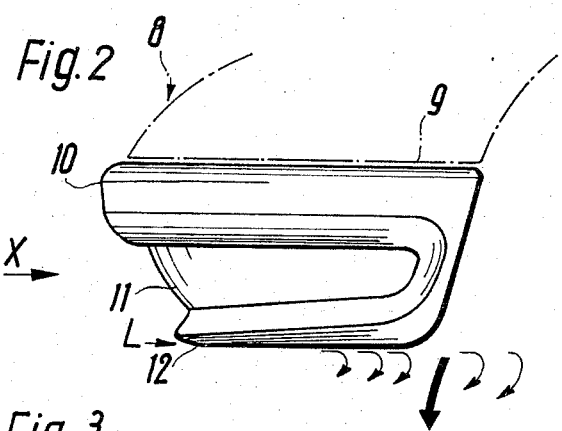
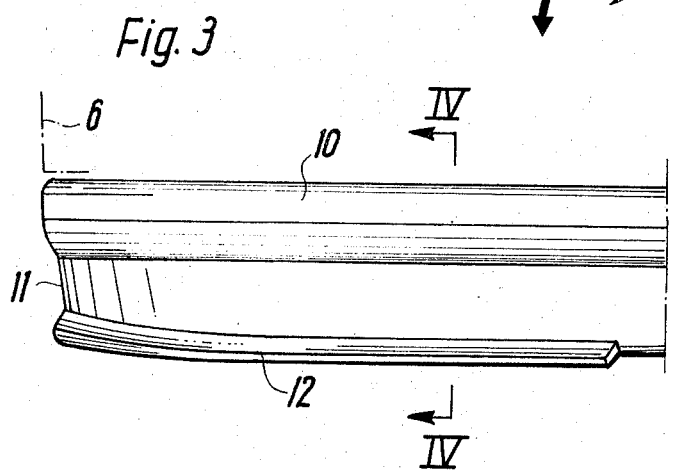
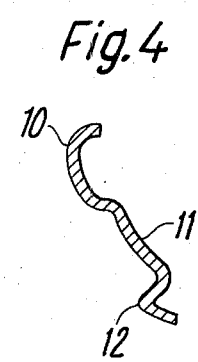

FRONT END FOR INCREASING DYNAMIC WHEEL PRESSURE OF PASSENGER MOTOR VEHICLES

The present invention relates to a front end for passenger motor vehicles with a bumper and with a device for increasing the dynamic wheel pressure.

In a known passenger motor vehicle (periodical "Schweizer Automobilerevue" No. 39 of Sept. 9, 1971, page 21), the bumper and the device increasing the dynamic wheel pressure (so-called spoiler) are formed by parts which are provided at the forward closure or terminal wall of the front end without functional interrelationship. The prior art device for increasing the dynamic wheel pressure is thereby represented by an additional bar-shaped part which extends obliquely from the top toward the bottom in the driving direction. The prior art construction entails the disadvantage that the device is not organically incorporated into the body contour whereby expensive measures are required for its mounting and fastening. Additionally, this prior art device has a disadvantageous effect on a transitionally neat termination of the body whereby the aesthetic impression of the front end section is strongly impaired.

The present invention is concerned with the task to provide a front end for a passenger motor vehicle in which a device for the increase of the dynamic wheel pressure and a bumper are organically incorporated into the body configuration as simple parts. The device and the bumper are thereby also to be brought into a functional interrelation.

The underlying problem is solved according to the present invention in that the device is arranged at a terminal wall extending underneath the bumper which passes over into the bumper as formed or shaped part. It is thereby of advantage if the device, the terminal wall and the bumper are integrally connected with one another in one piece. It is of advantage if the device is constituted by a bead-like enlargement of the terminal wall. The enlargement is preferably constructed V-shaped in cross section. It is also advantageous if the terminal wall between the device and the bumper is constructed convexly. Additionally, it is of advantage if the terminal wall extends over a considerable width of the passenger motor vehicle and obliquely from the top toward the bottom opposite the driving direction.

The advantages primarily achieved with the present invention reside in that the device is provided organically incorporated at the terminal wall passing over into the bumper of the front end whereby additional measures for the mounting and fastening of the device are eliminated. A termination of the body which is neat from a transitional point of view is also created thereby which has an advantageous effect on the aesthetic appearance of the front end portion of the passenger motor vehicle. A part which can be manufactured in a simple manner is constituted by the one-piece connection of the device, of the terminal wall and of the bumper. By these measures the bumper and the device are also brought into a functional interrelationship, owing to which the device carries out the same relative movement as the bumper in case of a load acting on the bumper which displaces the bumper relative to the body.

As a result thereof, a damaging of the device, for example, in case of an impact of the passenger motor vehicle at twice the normal walking speed is effectively counteracted. Additionally, the construction of the device and of the terminal wall assures that the dynamic front wheel pressure is considerably increased during the drive, as described hereinafter.

These and other objects, features and advantages of the present invention will become more apparent from the following description when taken in connection with the accompanying drawing which shows, for purposes of illustration only, one embodiment in accordance with the present invention, and wherein:

FIG. 1 is a partial side elevational view of a passenger motor vehicle with a device for increasing the dynamic wheel pressure in accordance with the present invention;

FIG. 2 is a partial side elevational view corresponding to FIG. 1, on an enlarged scale;

FIG. 3 is a partial elevational view, taken in the direction of arrow X of FIG. 2, and FIG. 4 is a cross-sectional view taken through the arrows IV—IV in FIG. 3.

Referring now to the drawing wherein like reference numerals are used throughout the various views to designate like parts, the passenger motor vehicle generally designated in FIG. 1 by reference numeral 1 includes in the illustrated area a roof 2, a door 3, a windshield 4, a wheel 5 and a body side part 6 with a headlight 7. In the front end 8 of the passenger motor vehicle, a bumper 10 is connected with the lateral part 6 at the place indicated by reference numeral 9 by conventional means; the bumper 10 cooperates with the body under interposition of impact energy-absorbing elements also of conventional construction and therefore not illustrated in detail. A terminal wall 11 passing over into the bumper 10 as shaped or formed part extends underneath the bumper 10. A device 12 for increasing the dynamic front wheel pressure is provided at the terminal wall 11.

According to FIG. 2, the device 12, the terminal wall 11 and the bumper 10 are connected with each other in one piece, as may be seen advantageously in FIG. 3. The device 12 is thereby organically incorporated and attached at the terminal wall 11 and is constituted by a bulge-like enlargement thereof which is constructed V-shaped in cross section. The terminal wall 11 is constructed convexly between the bumper 10 and the device 12. It extends over a considerable width of the passenger motor vehicle and obliquely from the top toward the bottom opposite the driving direction. A good functioning of the device is assured by this construction.

The operation of air passing dynamically over the bulge-like enlargement 12 to increase the wheel pressure may be seen in FIG. 2. In this figure, an air stream L, indicated by the arrow, flows over the device 12 so that it will be diverted in such a way that it is accelerated to form a vorticity behind the device. The vorticity is shown according to the curved arrows behind the device 12 in FIG. 2, and creates a vacuum. This vacuum prevents an uplift in the area of the front axle, i.e. adjacent the fender well of the vehicle, which is immediately behind the device 12, so that the dynamic wheel pressure of the front axle is increased.

According to FIG. 3, the device 12, the terminal wall 11 and the bumper 10 extend over the entire width of the passenger motor vehicle 1. As a result thereof, the device is not only highly effective but it forms with the parts 11 and 12 a unit matched to the body contour.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A front end for a vehicle of the type moving on wheels, said front end comprising:
    a front end enclosing means for covering a vehicle front end,
    a bumper means for absorbing forces acting on said vehicle front end, and
    a means for increasing dynamic wheel pressure of said vehicle,
    said means for increasing dynamic wheel pressure being arranged at a portion of said front end enclosing means, and
    said portion extending below said bumper means and being formed integrally as a shaped part of said bumper means,
    wherein said portion of said front end enclosing means, said bumper means and said means for increasing dynamic wheel pressure are connected with each other in one piece,
    wherein said means for increasing dynamic wheel pressure is constituted by a bulge-like enlargement of said portion, and
    wherein said enlargement is V-shaped in cross section.

2. A front end according to claim 1, wherein said portion is of convex construction between said means for increasing dynamic wheel pressure and said bumper means.

3. A front end according to claim 2, wherein said portion extends over a considerable part of the width of said vehicle, and said portion further extends in a longitudinal direction opposite to the driving direction and obliquely from the top toward the bottom.

4. A front end for a vehicle of the type moving on wheels, said front end comprising:
    a front end enclosing means for covering a vehicle front end,
    a bumper means for absorbing forces acting on said vehicle front end, and
    a means for increasing dynamic wheel pressure of said vehicle,
    said means for increasing dynamic wheel pressure being arranged at a portion of said front end enclosing means, and
    said portion extending below said bumper means being formed integrally as a shaped part of said bumper means,
    wherein said means for increasing dynamic wheel pressure is constituted by a bulge-like enlargement of said portion, and
    wherein said enlargement is V-shaped in cross section.

5. A front end according to claim 4, wherein said portion is of convex construction between said means for increasing dynamic wheel pressure and said bumper means.

6. A front end according to claim 4, wherein said portion extends over a considerable part of the width of said vehicle, and said portion further extends in a longitudinal direction opposite to the driving direction and obliquely from the top toward the bottom.

* * * * *